March 19, 1968 W. BERNDT ET AL 3,373,997

RECORD

Filed March 18, 1965

Inventors:
Walter Berndt
Horst Redlich
By: Spencer & Kaye
Attorneys

United States Patent Office 3,373,997
Patented Mar. 19, 1968

3,373,997
RECORD

Walter Berndt, Ulm (Danube), and Horst Redlich, Berlin-Wilmersdorf, Germany, assignors to Telefunken Aktiengesellschaft, Berlin-Charlottenburg, Germany Filed Mar. 18, 1965, Ser. No. 440,888
Claims priority, application Germany, Mar. 19, 1964, T 25,845
2 Claims. (Cl. 274—42)

ABSTRACT OF THE DISCLOSURE

A recording disc having an erasable magnetic track and a non-erasable mechanical track. The disc is provided with a ridge which follows the Archimedean spiral substantially about the center of the disc and which defines, between successive ridges, a magnetic recording track. The mechanical track, consituted by a laterally modulated groove, is cut into and is positioned substantially at the center of the magnetic recording track, the width of the magnetic track being great enough to accommodate the maximum lateral groove deflections, peak to peak.

The present invention relates to a phonograph record, and more particularly, to a recording disc for carrying two sound tracks, both of which described an Archimedean spiral about the center of the record.

For recording and reproduction of information in sound tracks, be it speech, music or any other signal, records utilizing a mechanically impressed groove to store information are generally the most economical recording medium, especially for applications requiring production of large numbers of the same record. One reason is that it is not necessary to record information on records at the same speed as that at which it will be played back, as is the case with magnetic tape or magnetic discs; a groove pattern may be impressed on a record in what is practically a single step process. Production of prerecorded tapes is a substantially less economical process. Such tapes, however, have certain advantages over records; they can be erased and re-recorded indefinitely, unlike records, which carry information in the form of fixed mechanical impressions.

Certain applications require two or more different bodies of information to be recorded on a common medium. Magnetic tape has been conventionally used for such application, since it provides several tracks in parallel, one or more of which may be erased without erasing the others. In recorded language courses, a teaching text is often prerecorded on one track and an adjacent track is used for a student's answers, which may be erased so that the text can be re-used by other students. Another application involves the automatic stepping of a slide projector by control pulses recorded on a magnetic tape along with an explanation of each slide on the same track. On an adjacent track, background music may be recorded which need not be erased even if the first-mentioned track is recorded over for a different slide sequence. The use of magnetic tapes for these applications precludes taking advantage of the economical production characteristics of records, insofar as the permanent information to be recorded is concerned.

It is therefore an object of the present invention to provide a recording medium for carrying two sound tracks, one of which is erasable and the other non-erasable.

It is a further object of the present invention to provide a recording medium which can be economically mass-produced, which carries prerecorded information, and one recording track of which is erasable.

A further object of the present invention is to provide a recording medium which may be mass-produced by an impressing or stamping process which fixes one sound track on the medium, and which contains a further sound track which may be easily recorded and erased, substantially without limit.

These objects as well as others are achieved according to the present invention, in which a discoid recording medium is provided carrying two sound tracks which follow in Archimedean spiral about the center of the disc, one of which is a permanent laterally recorded groove, the other of which is erasable and is formed as a magnetic impression on the surface of the disc along the path of the groove.

Additional objects and advantages of the present invention will become apparent upon consideration of the following description when taken in conjunction with the accompanying drawings in which.

Figures 1, 2, 3, 4:
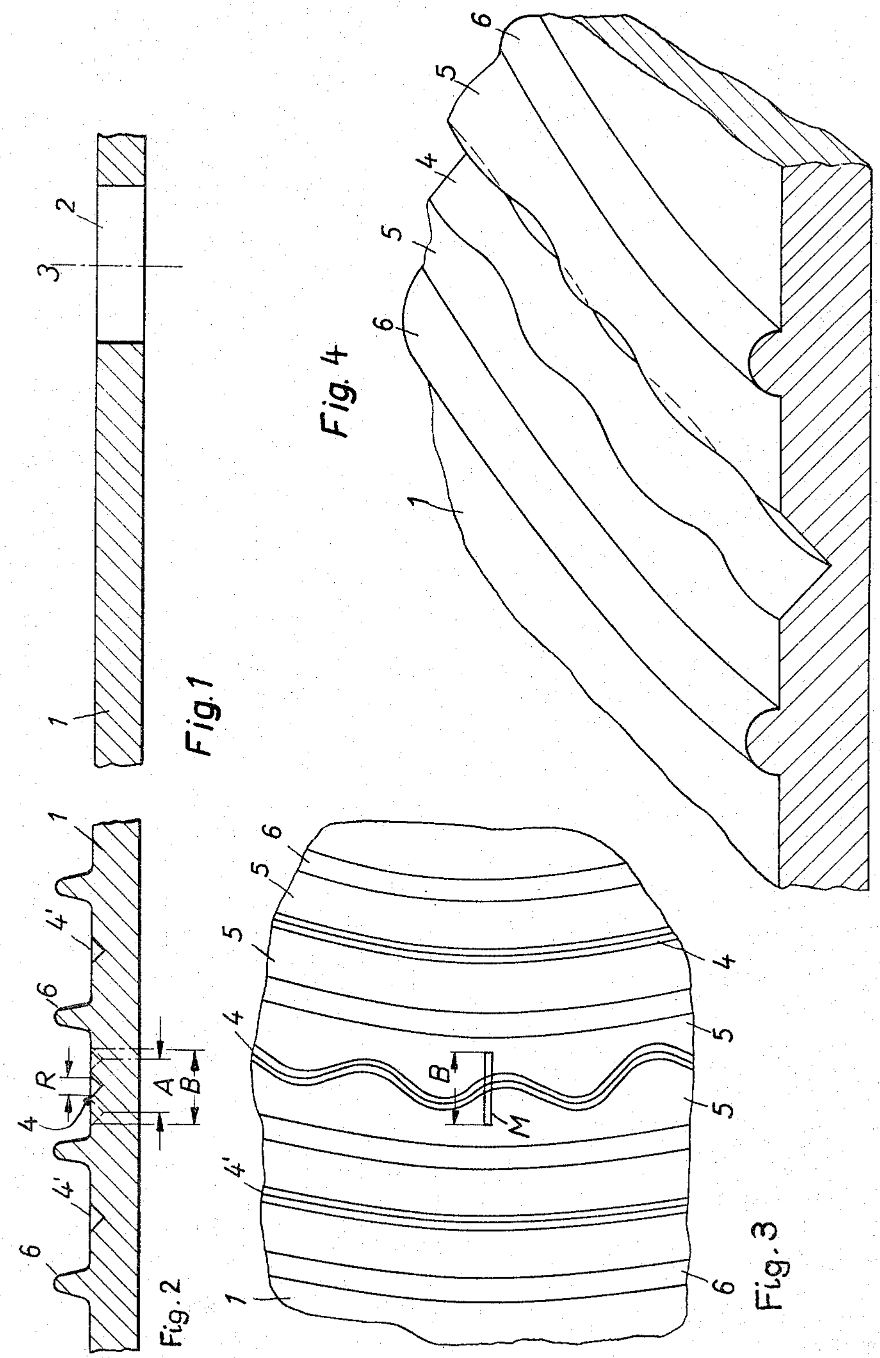
FIGURE 1 is a vertical sectional view taken through the center of a record constituting one embodiment of the invention.
FIGURE 2 is a vertical sectional view of the record of FIGURE 1, showing the recording region of the record.
FIGURE 3 is a plan view of the record shown in FIGURE 2.
FIGURE 4 is an enlarged perspective view of the record of FIGURES 2 and 3.

Referring now to the drawings, FIGURE 1 shows a recording medium 1, which has a conventional center hole 2, and which rotates about an axis 3 during recording or playback. The same numerals are used to denote corresponding elements in all of the figures. As shown in FIGURE 2, the grooves 4 are impressed on the surface of the record, and the mean center line of the groove forms an Archimedean spiral relative to the axis 3. As shown in FIGURE 3, two segments 4' of the groove 4, 4' contain no information. The groove 4, however, oscillates laterally about its average center line, which deflections constitute the recorded information. The groove width R is substantially constant. The maximum lateral deflection (peak to peak) measured between two successive opposite deflections is represented by the letter A, and the total width of the sound track formed by the groove is B. The relationship $B=A+R$ may be clearly seen from FIGURE 2.

In FIGURE 3, the magnetic recording gap M to be used with the record is illustrated schematically. This magnetic pick-up gap M, which should have a minimum width B, follows the mean center line of the groove independently of the deflections of the groove. Cutting a groove on the magnetic track does not, of course, produce cross talk between the two tracks, but merely reduces the effective width of the pick-up gap M by an amount R.

The record thus is provided with a surface track 5 on both sides of the groove 4, which track 5 is a magnetizable sound track. That is to say, the magnetizable path constituted by the two track portions 5 is on both sides of and immediately adjacent the modulated groove 4, and, since the groove 4 is of substantially constant width (R) and the width (B) between the extreme edges of the magnetic path is constant, the sum of the widths of the two track portions 5, 5, will likewise be constant ($A=B-R$). Both tracks may be recorded with the same recording head having a width B, which follows a path between the pitches of guide ridge 6, which follows the Archimedean spiral. This guide ridge is provided particularly to guide the magnetic head accurately along the sound track, and at the same time makes it easier to position the head on a desired groove.

FIGURE 4 is an enlarged perspective view of the central portion of FIGURE 3, showing particularly the recorded groove 4 and the lateral magnetic track 5 between the guide ridges 6.

In order to simplify the drawings, a homogeneous recording medium has been illustrated. However, complex recording media may also be used, such as those having a stiff middle layer of cardboard, plastic or other suitable material, covered on one or both sides with layers of a magnetizable material, which provide the magnetic sound track and in which the groove is cut. In such case, the exterior layers may be provided only on those portions of the surface 5 between the guide ridge 6. It should be further noted that records produced according to invention, having two recording tracks, may be played on conventional record players which have tone arms equipped with the proper transducers.

As has been illustrated, in a preferred embodiment of the invention, a spiral guide flange may be provided which protrudes above the surface of the record, for guiding the record player tone arm along the sound tracks.

Both sound tracks recorded according to the invention can be played back simultaneously by means of a dual scanning head. Such head includes, in close proximity to each other, an electromechanical transducer for scanning the groove, and an electromagnetic transducer for scanning the magnetic track. The electromechanical transducer may be a conventional magnetic or electrodynamic pick-up or a crystal pick-up, any one of which utilizes a stylus which rides along the mechanical groove and is moved laterally thereby as the record rotates. The electromagnetic transducer may include heads for recording, playing back and erasing the magnetic sound track. Both of these transducer systems, the electromechanical and the electromagnetic, are attached to a common movable tone arm, which may be of the conventional type, in such a way that the above-mentioned stylus rides in the groove at a predetermined pressure. The readout head may be designed so that, at this pressure, the magnetic gap of the electromagnetic transducer system is positioned properly with respect to the surface of the record, or it may rest on the surface of the record with a predetermined pressure. The grooves constituting the permanent sound track (mechanical sound track) may be provided in the conventional and economical manner, that is, by a stamping process, when the record itself is produced. If, for example, the record is to be a language course, the permanent sound track may contain the teaching text of a lesson along with questions for the student. The student may then record his answers in the adjacent magnetic sound track, and then submit the record to the school or teacher for correction and grading. Subsequently, the magnetic track containing his answers may be erased, and the record re-used for another student.

As has been shown, the groove has substantially constant width and depth. In order to assure that the electromagnetic transducer gap will always be in contact with a part of the magnetic surface track, and furthermore that it will always be in contact with a constant area of the track, the width of the transducer gap is made at least equal to the sum of the groove width (at the surface of the record) and the maximum lateral groove deflection. Thus the transducer gap is always in contact with an area of the magnetic track commensurate with its own width less the width R of the groove. Therefore, the instantaneous position of the groove relative to that of the sound track does not affect performance of the system.

In a preferred embodiment both sides of a record are provided with sound tracks according to the invention—that is, a mechanical and a magnetic track on each side of a record.

It will be understood that the above description of the present invention is susceptible to various modifications, changes, and adaptations, and the same are intended to be comprehended within the meaning and range of equivalents of the appended claims.

What is claimed is:

1. A recording disc containing two sound tracks which follow an Archimedean spiral substantially about the center of the record, at least one side of said recording disc having a surface layer of magnetizable material; means arranged on the same side of the disc as said magnetizable material and forming a non-erasable first sound track along said spiral in the form of a laterally modulated mechanical groove of substantially constant width running in said magnetizable material; and means forming an erasable second sound track in the form of a magnetizable path following said mechanical groove and extending substantially along both sides thereof, the width between the extreme edges of said magnetizable path constituting said second sound track being constant and at least equal to the sum of the width of said mechanical groove at said surface and the maximum lateral deflection, peak to peak, of said modulated groove, in consequence of which said magnetizable path has two portions which are on opposite sides of and immediately adjacent to said modulated groove and the sum of the widths of said two portions of said magnetizable path is also constant.

2. A record as defined in claim 1, including means forming a ridge along the surface of said magnetic layer, said ridge extending parallel to the path of said Archimedean spiral for forming a recording path an said surface defined by adjacent pitches of said ridge, said recording path including said groove and the magnetizable path extending along both sides of the groove.

References Cited

UNITED STATES PATENTS

| | | | |
|---|---|---|---|
| 2,517,440 | 8/1950 | Kleber | 179—100.1 |
| 3,214,178 | 10/1965 | Warnke | 274—41.4 |

LEONARD FORMAN, *Primary Examiner.*

F. J. D'AMBROSIO, *Assistant Examiner.*